US012706751B2

(12) United States Patent
El Guindi et al.

(10) Patent No.: US 12,706,751 B2
(45) Date of Patent: Aug. 11, 2026

(54) DATA ENCRYPTION FOR A HEARING DEVICE

(71) Applicant: SONOVA AG, Staefa (CH)

(72) Inventors: Nadim El Guindi, Bassersdorf (CH); Anne Thielen, Stäfa (CH); Andreas Breitenmoser, Zurich (CH); Harald Krueger, Affoltern am Albis (CH); Alexander Maksyagin, Ebmatingen (CH)

(73) Assignee: Sonova AG, Staefa (CH)

( * ) Notice: Subject to any disclaimer, the term of this patent is extended or adjusted under 35 U.S.C. 154(b) by 78 days.

(21) Appl. No.: 18/590,613

(22) Filed: Feb. 28, 2024

(65) Prior Publication Data

US 2024/0305470 A1 Sep. 12, 2024

(30) Foreign Application Priority Data

Mar. 8, 2023 (EP) .................................... 23160665

(51) Int. Cl.

| | |
|---|---|
| ***H04L 29/06*** | (2006.01) |
| ***G06F 21/62*** | (2013.01) |
| ***H04L 9/08*** | (2006.01) |
| ***H04L 9/32*** | (2006.01) |

(52) U.S. Cl.

CPC ........ *H04L 9/3247* (2013.01); *G06F 21/6218* (2013.01); *H04L 9/0819* (2013.01); *H04L 9/0838* (2013.01); *H04L 9/3234* (2013.01)

(58) Field of Classification Search

CPC ... H04L 9/3247; H04L 9/0819; H04L 9/0838; H04L 9/3234; H04L 63/0428; G06F 21/6218; H04R 2225/55; H04W 12/50

See application file for complete search history.

(56) References Cited

U.S. PATENT DOCUMENTS

| | | | | |
|---|---|---|---|---|
| 9,210,187 | B1 | 12/2015 | Mackey et al. | |
| 2003/0165239 | A1 * | 9/2003 | Bantz | H04K 1/00 380/53 |
| 2006/0133604 | A1 | 6/2006 | Buer et al. | |

(Continued)

FOREIGN PATENT DOCUMENTS

| | | |
|---|---|---|
| EP | 3720080 A1 | 10/2021 |
| EP | 3982646 A1 | 4/2022 |

(Continued)

OTHER PUBLICATIONS

Extended European Search Report and Written Opinion mailed Nov. 11, 2023 in International Application No. EP23160665.

*Primary Examiner* — Yogesh Paliwal
(74) *Attorney, Agent, or Firm* — ALG Intellectual Property, LLC

(57) ABSTRACT

There is provided a method for sharing data generated by a hearing device, comprising providing an encryption key in the hearing device; providing a decryption key in an external entity separate from the hearing device; generating data by a sensor of the hearing device, encrypting the data with the encryption key and storing the encrypted data on the hearing device; reading the encrypted data from the hearing device; and decrypting the read encrypted data with the decryption key in the external entity, wherein a user authorizes access to the sensor generated data by the external entity.

10 Claims, 12 Drawing Sheets

(56) References Cited

U.S. PATENT DOCUMENTS

| | | | | |
|---|---|---|---|---|
| 2016/0173278 | A1* | 6/2016 | Pedersen | H04L 63/1483<br>380/255 |
| 2016/0330573 | A1* | 11/2016 | Masoud | H04W 12/0431 |
| 2017/0006392 | A1* | 1/2017 | Pedersen | H04R 25/70 |
| 2019/0110143 | A1* | 4/2019 | Boretzki | H04R 25/558 |
| 2019/0132691 | A1* | 5/2019 | Gehring | H04R 25/554 |
| 2019/0379644 | A1* | 12/2019 | Schneider | H04L 9/0894 |
| 2020/0273566 | A1* | 8/2020 | Bhowmik | G06F 21/6245 |
| 2021/0058723 | A1* | 2/2021 | Maksyagin | H04R 1/1041 |

FOREIGN PATENT DOCUMENTS

| | | | |
|---|---|---|---|
| WO | 2016124549 | A1 | 8/2016 |
| WO | 2020172580 | A1 | 8/2020 |

* cited by examiner

DATA ENCRYPTION FOR A HEARING DEVICE

RELATED APPLICATIONS

The present application claims priority to EP Patent Application No. 23160665.8, filed Mar. 8, 2023, the contents of which are hereby incorporated by reference in their entirety.

BACKGROUND INFORMATION

Hearing devices include sensors. Sensors can be an accelerometer, photoplethysmography (PPG) sensor, an electroencephalogram (EEG) sensor, temperature sensor, a microphone, or hearing device component capable of collecting data. These sensors can be configured to collect health data. The health data can be related to physical parameters of a hearing device user (e.g., heart rate, temperature) or mental state of the user (e.g., stressed, tired).

The hearing device can store this health data, but that involves some risk because it can be accessed by unauthorized parties for nefarious purposes. For example, when a device is lost or stolen, an unauthorized party can illegitimately use the health data stored on the hearing device to learn sensitive and confidential information about the hearing device user.

While some proprietary communication protocols and wireless communication protocols (e.g., Bluetooth™) provide data encryption services, this level of security may not be sufficient to protect the data entirely, because the data is encrypted only when being transmitted but not while being stored on a hearing device. An unauthorized party can gain access to the health data stored on a hearing device, e.g., by connecting directly to the hearing device (which was lost, stolen or not properly secured from an unauthorized wireless pairing).

BRIEF DESCRIPTION OF THE DRAWINGS

Hereinafter, examples of the invention will be illustrated by reference to the attached drawings, wherein.

DETAILED DESCRIPTION

Figure 1:
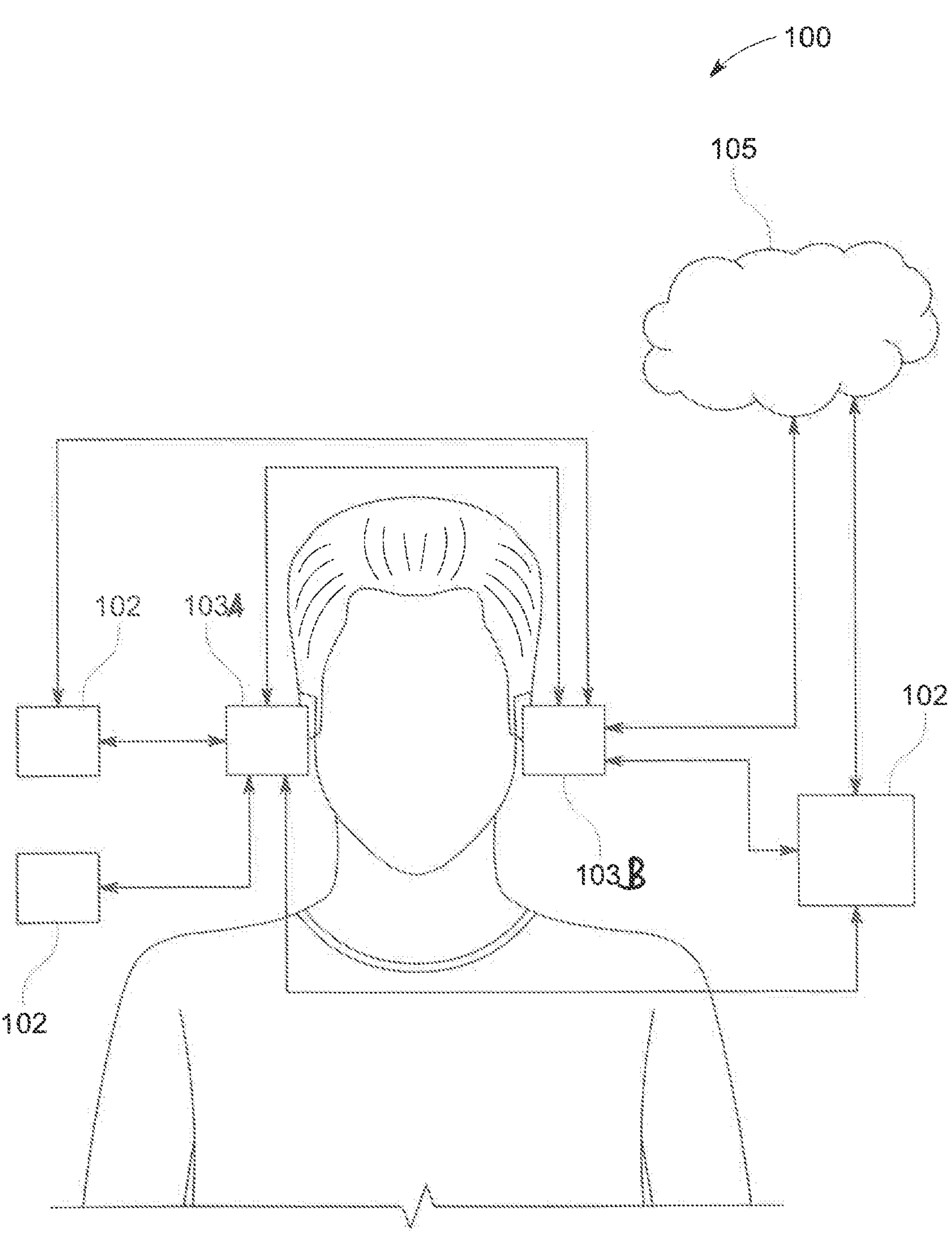
FIG. 1 illustrates an example of a communication environment with hearing devices, wireless communication devices, and a network.

The disclosed technology generally relates to methods for sharing data generated by a hearing device.

Embodiments described herein provide for a safe and convenient way of sharing data generated by a hearing device.

The embodiments described herein are beneficial in that thereby sensor data generated by the hearing device can be shared in a safe and convenient manner under control of a user of the hearing device.

In a first embodiment, the encryption key and the decryption key may be autonomously—or internally—generated on the hearing device.

For example, the decryption key may be provided to the external entity only if a user of the hearing device has authorized access of the external entity to the data generated by the hearing device sensor.

In a second embodiment, the encryption key may be externally provided to the hearing device.

For example, the hearing device may accept the encryption key only if a user of the hearing device has authorized access of the external entity to the data generated by the hearing device sensor. In particular, the encryption key may be authenticated by using an authentication key; e.g., the encryption key may be signed based on the authentication key. For example, the encryption key may be signed based on the authentication key only if the user has authorized access of the external entity to the data generated by the hearing device sensor. According to one example, the authentication key may be provided as the private part of a root key pair; in particular, the encryption key may be accepted by hearing device only if the hearing device can verify the signature based on the authentication key using the public part of the root key pair.

In a third embodiment, the encryption key may be established in the hearing device using a key agreement method.

For example, the encryption key may be not authenticated and the hearing device may accept the encryption key only if a user of the hearing device has authorized access of the external entity to the data generated by the hearing device sensor. Alternatively, the encryption key may be authenticated by using an authentication key, wherein the data used to establish the encryption key may be, for example, signed based on the authentication key, and the data used to establish the encryption key may be signed based on the authentication key only if the user has authorized access of the external entity to the data generated by the hearing device sensor. According to one example, the key agreement method may be a Diffie-Hellman method, wherein, for example, the ephemeral public key of the external entity may be signed based on the authentication key. Alternatively, the authentication key is provided as the private part of a root key pair; in particular, the encryption key may be accepted by the hearing device only if the hearing device can verify the signature based on the authentication key using the public part of the root key pair.

The following features can be optionally implemented in all embodiments.

According to one example, the user may authorize access of the external entity to the data generated by the hearing device sensor by user interaction with the hearing device.

According to an alternative example, the user may authorize access of the external entity to the data generated by the hearing device sensor by user interaction with an external agent trusted by the hearing device, wherein, the external agent, for example, may be a trusted application on a device directly connected to hearing device and possessing an external agent authentication key which can be verified by the hearing device, or wherein the external agent, for example, may a trusted online service possessing an external agent authentication key which can be verified by the hearing device.

According to one example, the external entity may be a consumer client connected to the hearing device.

According to an alternative example, the external entity may be an online service.

According to one example, the external entity may read the encrypted data from the hearing device via a relay device.

According to one example, the encryption key and the decryption key may be symmetric.

According to an alternative example, the encryption key is a public key and the decryption key is a private key.

A "hearing device" as used hereinafter is any ear level device suitable for reproducing sound by stimulating a user's hearing, such as an electroacoustic hearing aid, a bone conduction hearing aid, am active hearing protection devoice, a hearing prosthesis device such as a cochlear implant, a wireless headset, an earbud, an earplug, an earphone, etc.

A "user agent client" as used hereinafter is a process acting on behalf of a user of a hearing device who is registered via a user account; such user account may be operated, for example, by or on behalf of the manufacturer of the hearing device and may implemented on a backend, in a cloud or on a website.

A "consumer client" as used hereinafter is a process which seeks to read data from a hearing device; such process may be implemented on a dedicated device, such as a mobile phone.

An "online authorization service" as used hereinafter is a service for authorizing consumer clients, which is provided online, for example by or on behalf of the manufacturer of the hearing device.

An "online decryption service" as used hereinafter is a service for decrypting encrypted data read from the hearing device, which is provided online, for example by or on behalf of the manufacturer of the hearing device.

A "trust relationship" between two entities (which then mutually form a "trusted" entity) as used hereinafter means that they were set up to trust each other (e.g. with respect to certain operations or data) and that they can authenticate each other. A trust relationship can be a unidirectional one—this is when one entity trusts the other and can authenticate it, but not vice versa. Technically it means that one entity can authenticate the other based on a symmetric key shared between the entities, or public key used by one entity to authenticate another entity which possesses the corresponding private key. Bluetooth pairing is an example of establishing such a trusted relationship, where as a result of the pairing the paired devices will get a shared key based on which they can later verify that they were indeed paired and hence can trust each other.

The present application relates to method for sharing data generated by a hearing device, wherein an encryption key is provided in the hearing device and a decryption key is provided in an external entity separate from the hearing device. The encryption key may be used to encrypt data generated by a sensor of the hearing device with the encryption key, with the encrypted data being stored on the hearing device. A user of the hearing device may authorize access to the sensor generated data by the external entity, in which case the encrypted data are read from the hearing device and the read encrypted data are decrypted with the decryption key in the external entity. In other words, while the encrypted sensor data stored on the hearing device in principle may be readable for any connected device, it can be decrypted, however, only if authorization by the user of the hearing device is given.

There are several ways of providing the encryption key in the hearing device. According to a first example, the encryption key and the decryption key may be autonomously—or internally—generated on the hearing device. In a second example, the encryption key may be externally provided to the hearing device. In a third example, the encryption key may be established in the hearing device using a key agreement method.

FIG. 1 illustrates a communication environment 100. The communication environment 100 includes wireless communication devices 102 and hearing devices 103. The communication environment 100 can include a single "wireless communication device 102" or multiple "wireless communication devices 102". Similarly, the communication environment 100 can include a single device "hearing device 103" or multiple "hearing devices 103".

As shown by double-headed bold arrows in FIG. 1, the wireless communication devices 102 and the hearing devices 103 can communicate wirelessly. Wireless communication includes wirelessly transmitting information, wirelessly receiving information, or both. This wireless communication can include exchange of encrypted or unencrypted data as well as cryptographic keys. Each wireless communication device 102 can communicate with each hearing device 103 and each hearing device 103 can communicate with the other hearing device. Wireless communication can include using a protocol such as Bluetooth™, Bluetooth Low Energy™, a proprietary protocol communication (e.g., binaural communication protocol between hearing aids based on Near Field Communication (NFC) or bimodal communication protocol between hearing devices) or ZigBee™, Wi-Fi™.

The wireless communication devices 102 shown in FIG. 1 can include mobile computing devices (e.g., mobile phone or tablet), computers (e.g., desktop or laptop), televisions (TVs) or components in communication with television (e.g., TV streamer), a car audio system or circuitry within the car, tablet, remote control, an accessory electronic device, a wireless speaker, or watch. The wireless communication devices 102 can also be fitting stations, which are computing devices configured to fit (e.g., program or test) a hearing aid. The wireless communication devices 102 are configured to connect with the network 105, and the wireless communication devices 102 can access application interfaces (e.g., APIs) on the hearing devices 103.

The hearing devices 103 can provide audio or audio signals to the hearing device user. A hearing device user can wear single hearing device 103 or two hearing devices 103, where one hearing device 103 is on each ear. Some example hearing devices include hearing aids, headphones, earphones, assistive listening devices, or any combination thereof. Hearing devices 103 can include both prescription devices and non-prescription devices configured to be worn on or near a human head.

As an example of a hearing device, a hearing aid is a device that provides amplification, attenuation, or frequency modification of audio signals to compensate for hearing loss or difficulty; some example hearing aids include a Behind-the-Ear (BTE), Receiver-in-the-Canal (RIC), In-the-Ear (ITE), Completely-in-the-Canal (CIC), Invisible-in-the-Canal (IIC) hearing aids or a cochlear implant (where a cochlear implant includes a device part and an implant part).

The hearing devices 103 are configured to binaurally or bimodally communicate. The binaural communication can include a hearing device 103 transmitting information to or receiving information from another hearing device 103. Information can include volume control, signal processing information (e.g., noise reduction, wind canceling, directionality such as beam forming information), encryption information (e.g., encrypted data, unencrypted data, and cryptographic key material, such as public or private keys) or compression information to modify sound fidelity or resolution. Binaural communication can be bidirectional (e.g., between hearing devices) or unidirectional (e.g., one hearing device receiving or streaming information from another hearing device). Bimodal communication is like binaural communication, but bimodal communication includes two devices of a different type, e.g. a cochlear device communicating with a hearing aid.

The network 105 is a communication network. The network 105 enables the hearing devices 103 or the wireless communication devices 102 to communicate with a network or other devices. The wireless communication 102 and/or the hearing device 103 can use the network 105 to access services provided by the hearing device manufacturer and third parties.

The network 105 can be a Wi-Fi™ network, a wired network, or e.g. a network implementing any of the Institute of Electrical and Electronic Engineers (IEEE) 802.11 standards. The network 105 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some embodiments, the network 105 can include communication networks such as a Global System for Mobile (GSM) mobile communications network, a code/time division multiple access (CDMA/TDMA) mobile communications network, a 3rd, 4th or 5th generation (3G/4G/5G) mobile communications network (e.g., General Packet Radio Service (GPRS)) or other communications network such as a Wireless Local Area Network (WLAN).

It is noted that while FIG. 1 illustrates a binaural hearing system with a pair of communicatively coupled hearing devices, the features described herein are applicable also to monaural systems or a single hearing device.

Figure 2:
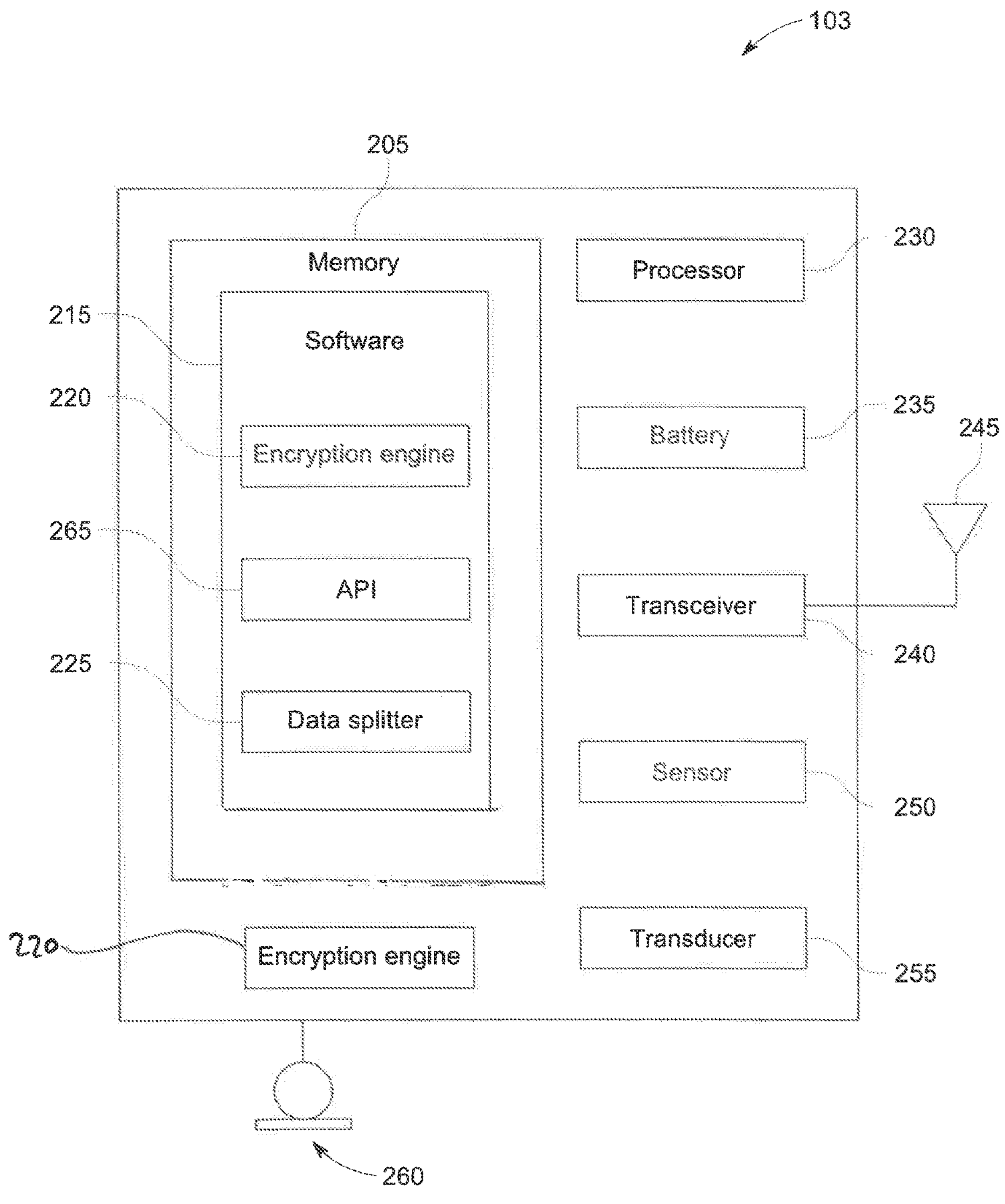
FIG. 2 illustrates an example of the hearing device from FIG. 1 in more detail.

FIG. 2 is a block diagram illustrating the hearing device 103 from FIG. 1 in more detail. FIG. 2 illustrates the hearing device 103 with a memory 205, software 215 stored in the memory 205, the software 215 may include an encryption engine 220 and a data splitter 225. Alternative, the encryption engine may be implemented as a dedicated hardware block. In some embodiments, the hearing device 103 comprises only the encryption engine 200 or only the data splitter, but in other embodiments, the hearing device 103 comprises both.

The hearing device 103 in FIG. 2 also has a processor 230, a battery 235, a transceiver 240 coupled to an antenna 245, a sensor 250, a transducer 255, a microphone 260, and an application interface (API) 265. Each of these components is described below in more detail. Although FIG. 2 shows all of these components and software modules, not all of the components or modules are required to implement the disclosed technology.

The memory 205 stores instructions for executing the software 215 comprised of one or more modules, data utilized by the modules, or algorithms. The modules or algorithms perform certain methods or functions for the hearing device 103 and can include components, subcomponents, or other logical entities that assist with or enable the performance of these methods or functions. Although a single memory 205 is shown in FIG. 2, the hearing device 103 can have multiple memories 205 that are partitioned or separated, where each memory can store different information.

The encryption engine 220 is used for encrypting or decrypting data. The encryption engine can generate a key. The key can be public key, a private key, or a symmetric key. For example, the key can be a 128-bit key. Although a 128-bit key can be used, a longer (e.g., 256 bits) or shorter key length can also be used. The encryption engine 220 can use and implement cryptographic algorithms, such as Data Encryption Standard (DES), Triple DES (3DES), Advanced Encryption Standard (AES), Advanced Encryption Standard-Counter with Cipher Block Chaining-Message Authentication Code (AES-CCM), or another block cipher algorithm.

The data splitter 225 can split data between a first and second hearing device (or another device). The data splitter 225 can split the data such that it is only possible to make the data useful once it is put together again (or read together). In other words, split portion of the data may be worthless individually, but provide information when put together. The hearing device can implement cryptographic splitting, which includes encrypting data, splitting the encrypted data into smaller data units, distributing those smaller units to different storage locations. And, in some embodiments, the device storing the data can then further encrypt the data at its new location. The data splitter 225 can control the data splitting at the bit level, with a key.

The API 265 is an application interface (API) that defines interactions between multiple software applications or mixed hardware-software intermediaries for the hearing device 103. The API 265 is accessible to wireless communication devices 102 or other devices. The API 265 defines calls or requests that can be made, how to make them, the data formats that should be used, the conventions to follow for the hearing device. The API 265 can provide support for Generic Attribute Profile (GATT) objects for Bluetooth™.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), Neural network engines, appropriately programmed with software and/or computer code, or a combination of special purpose hardware and programmable circuitry. The processor 230 can execute processor instructions stored in the hearing devices memory 205.

Also, although the processor 230 is shown as a separate unit in FIG. 2, the processor 230 can be on a single chip with the transceiver 245, and the memory 205. The processor 230 can also include a DSP configured to modify audio signals based on hearing loss or hearing programs stored in the memory 205. In some embodiments, the hearing device 103 can have multiple processors, where the multiple processors can be physically coupled to the hearing device 103 and configured to communicate with each other.

The battery 235 can be a rechargeable battery (e.g., lithium ion battery) or a non-rechargeable battery (e.g., Zinc-Air) and the battery 235 can provide electrical power to the hearing device 103 or its components. In general, the battery 235 has significantly less available capacity than a battery in a larger computing device (e.g., a factor 100 less than a mobile phone device and a factor 1000 less than a laptop).

The transceiver 240 can be used to transmit or receive data wirelessly. The transceiver 240 can be configured to operation on standard wireless communication frequencies and use wireless communication protocols (e.g., Bluetooth™). The transceiver 240 can be in electronic communication with the antenna 245. The antenna 245 can be configured for operation in unlicensed bands such as Industrial, Scientific, and Medical Band (ISM) using a frequency of 2.4 GHz. The antenna 245 can also be configured to operation in other frequency bands such as 5.8 GHZ, 3.8 MHZ, 10.6 MHz, or other unlicensed bands.

The sensor 250 can be an accelerometer, photoplethysmography (PPG) sensor, an electroencephalogram (EEG) sensor, temperature sensor, humidity sensor, a microphone, or hearing device component capable of collecting data. These sensors can be configured to collect health data. The health data can be related to physical parameters of a hearing device user (e.g., heart rate, temperature) or mental state of the user (e.g., stressed because of a high heart rate). The sensor 250 can provide its collected data, e.g., unencrypted plain data, to the processor 230 for encryption or to the memory 205 for storage.

The sensor 250 can be in a housing of the hearing device, where the housing is located behind a user's ear (e.g., outside of an ear). Alternatively, the sensor 250 can be located in a inside a user's ear canal or at least partially inside a user's ear, wherein the housing encapsulating the sensor is completely or partially inside the user's ear.

The microphone 260 is configured to capture sound and provide an audio signal of the captured sound to the processor 230. The microphone 260 can also convert sound into audio signals. The processor 230 can modify the sound (e.g., in a DSP) and provide the processed audio derived from the modified sound to a user of the hearing device 103. Although a single microphone 250 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations. In such an example, the processor 230 would include a DSP configured to perform beam forming operations.

The hearing device 103 can also include a transducer 255 to output audio signals. For example, the hearing device 103 can include a loudspeaker or a coil for a cochlear device configured to convert audio signals into nerve stimulation or electrical signals.

Figure 3A:
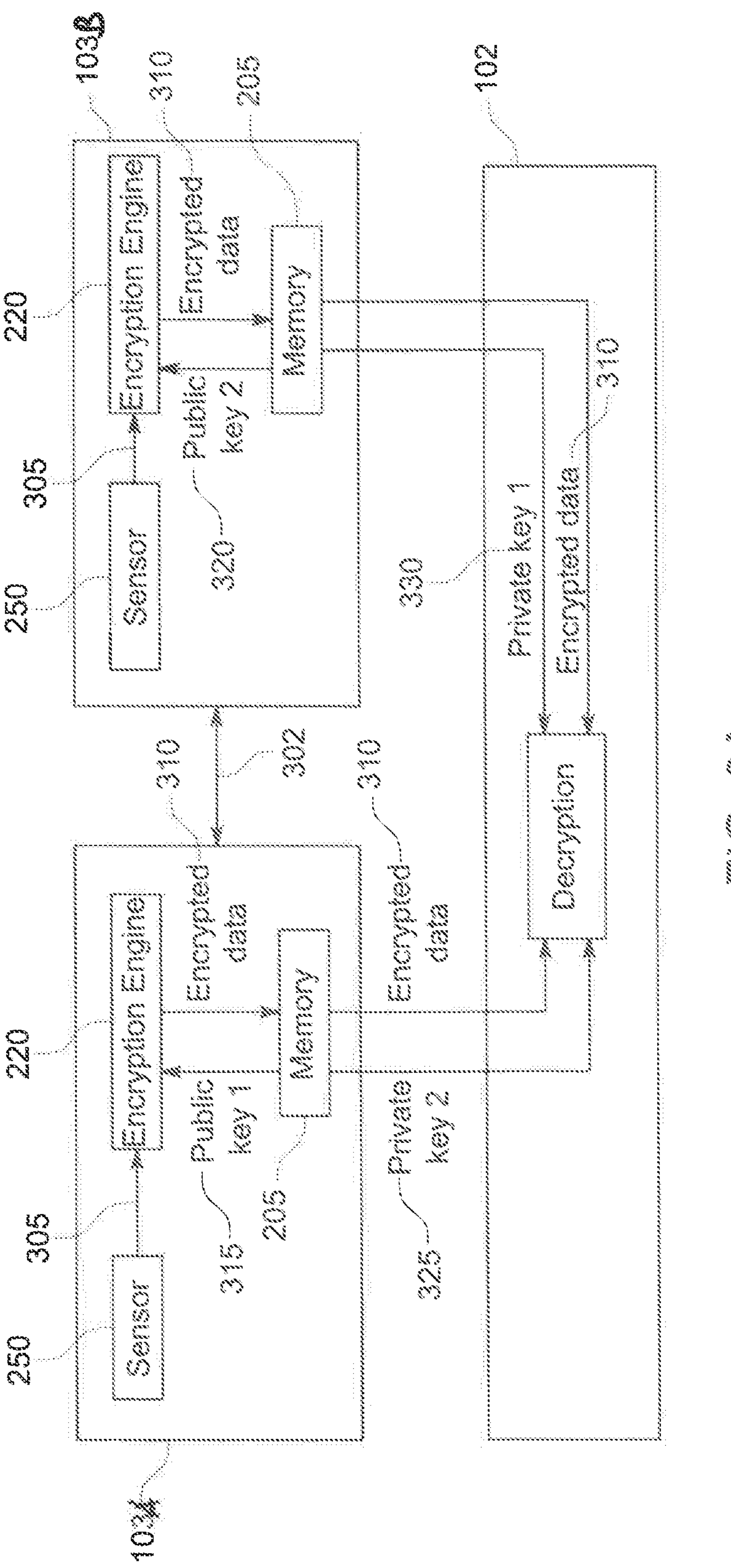
FIGS. 3A, 3B, and 3C illustrate different examples for securing data with a hearing device.

FIG. 3A illustrates a first and second hearing device for encrypting and decrypting information. On the left side of FIG. 3A is a first hearing device 103A that includes a sensor 250, an encryption engine 220, and a memory 205. On the right side of FIG. 3A is a second hearing device 103B that also includes a sensor 250, an encryption engine 220, and a memory 205. Other components from FIG. 2 are not shown in FIG. 3A, but can be included in the first and second hearing devices 103A,B. As discussed below, one security advantage of FIG. 3A implementation is that it is not possible to decrypt the data stored on either hearing device without both devices being able to communicate with each other.

For the implementation illustrated in FIG. 3A, the disclosed technology can use monaural or binaural encryption to secure data (e.g., health data). For example, a sensor 250 for the first hearing device 103A can generate data and then encryption engine 220 can encrypt the data. The encryption engine 220 can use a public key or a symmetric key for the encryption. The second hearing device 103B, on the right side, can also collect data from a sensor 250, but the second hearing device 103B can use a different public key or different symmetric key to encrypt data.

To decrypt the data stored on the first hearing device or second hearing device 103A,B, the first and second hearing devices 103A,B must establish a trust relationship. The trust relationship can be based on a binaural connection between the first and second hearing device, where each device is authenticated and authorized to perform operations by the other hearing device 103B,A. The authentication process can happen at the manufacturing stage, e.g., when the hearing devices are made or programmed by the hearing device manufacturer, the hearing device manufacturer can authenticate and authorize each hearing device to establish a trusted relationship. Alternatively, authentication can occur based on a pairing gesture to pair to the two hearing devices. Trusted devices, which are authenticated are indicated as "trusted", are allowed to access services whereas untrusted or unknown devices require authorization, e.g. based on user interaction, before access to the service or data is granted. If a hearing device 103 trusts another hearing device because it has been previously authenticated, a link key is stored on the hearing device 103 and the hearing device is designated as "trusted" by the other hearing device. The trust relationship is shown by the double-headed arrow 302 in FIG. 3A.

The hearing device 103A on the left side can use a public key 315 (also referred to as a "first public key") to encrypt data from sensor 250 in the encryption engine 220 and then store the encrypted data 310 in the memory 205. The hearing device 103A on the left side can provide this encrypted data to the wireless communication device 102. Also, the hearing device 103A on the left side can store a private key "2" 325, which is used to decrypt data encrypted by the hearing device 103B on the right side.

The hearing device 103B on the right side can use a public key 320 (also referred to as a "second public key") to encrypt data from sensor 250 in the encryption engine 220 and then store the encrypted data 310 in the memory 205. The hearing device 103B on the right side can provide this encrypted data to the wireless communication device 102. Also, the hearing device 103B on the right side can store a private key "1" 325, which is used to decrypt data on the other hearing device.

Figure 3B:
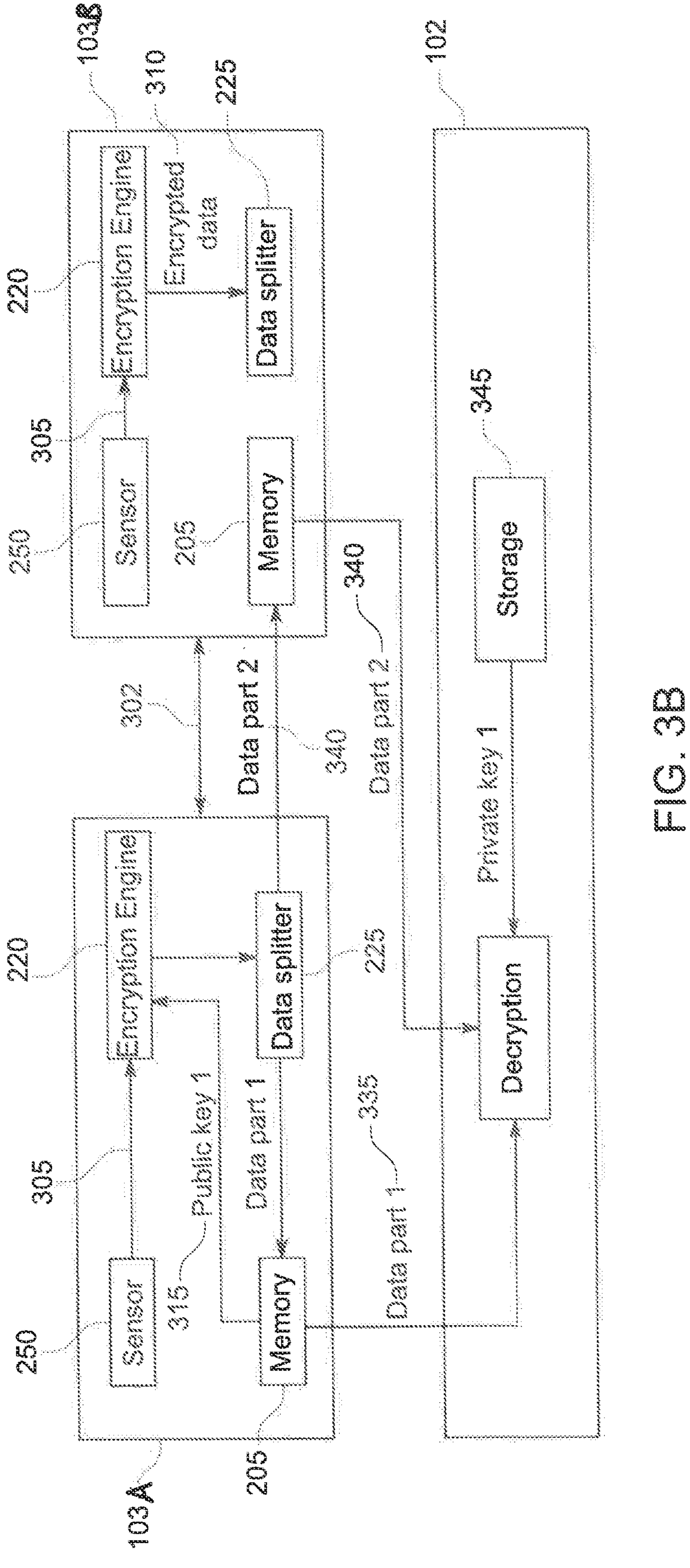

FIG. 3B is another implementation of the disclosed technology, and it implements data splitting to secure data. On the left side of FIG. 3B is a first hearing device 103A that includes a sensor 250, an encryption engine 220, a memory 205, and a data splitter 225. On the right side of FIG. 3A is a second hearing device 103B that also includes sensor 250, an encryption engine 220, a memory 205, and a data splitter 225 shown with dashed lines to indicate it is optional (e.g., only one of the hearing devices needs to configured to split the data, while both are configured to store data). The implementation of FIG. 3B illustrates that data is encrypted by one hearing device 103 and that hearing device 103 splits the encrypted data. Then, each hearing device 103A,B can store partially the encrypted data such that a single data part cannot be decrypted even with a private key. The hearing devices 103 can also have a trust relationship as shown by the double-headed arrow 302 in FIG. 3B.

The encrypted data can only be decrypted when the data parts (also referred to as "portions") of both hearing devices 103A, B are available. The private key may be stored on a single hearing device or in a wireless communication devices 102. Specifically, as shown in FIG. 3B, the wireless communication device 102 can perform decryption operations based on receiving the data part "1" 335 from the hearing device 103A on the left side and data part "2" 340 from the hearing device 103B on the right side. To perform the decryption operation, the wireless communication device 102 can use a private key 1, which is configured to decrypt data that was encrypted with public key 1 (used in the hearing device). Alternative to public-private key pairs, a symmetric key may be used.

In general, FIG. 3B illustrates that hearing device data can be securely protected from unauthorized data access in the event that one hearing device is lost or accessed without permission.

Figure 3C:
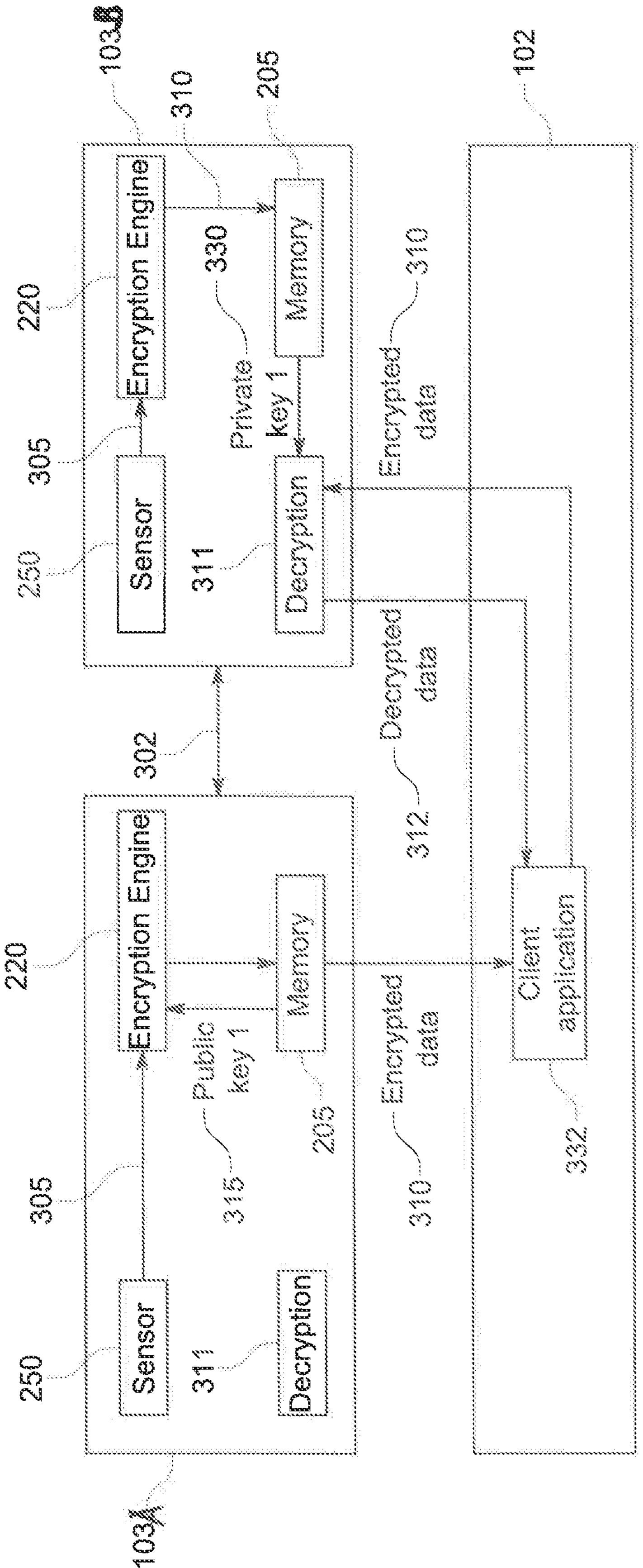

In a further embodiment, FIG. 3C illustrates an implementation to prevent data breach of a hearing device, where in contrast to other embodiments, the private key of the hearing device 103 is never shared with another device (also referred to as a "client"). Rather, the two hearing devices 103A,B can decrypt the data for each other without the need to use another device. Because the private key never leaves the hearing device and is not accessible, the security of system is improved.

As illustrated in FIG. 3C in the left hearing device 103A, a sensor 250 sends unencrypted data 205 to an encryption engine 220, which uses a public key "1" 315 to encrypt the data. The encrypted data is stored in memory 205. The hearing device 103A can transmit the encrypted data 310 to a wireless communication device 102, which has a client application 332. The client application 332 can read that the data is encrypted, but it cannot decrypt it. Rather, if the client application wants to decrypt the data and has permission, the client application transmits the encrypted data to the hearing device 103B on the right. The hearing device on the right has a private key "1" 315 that it uses to decrypt the encrypted data 310. The decrypted data 312 is sent to the client application 332 so that it is available to the client application in clear text. The memory 205 can be configured to prevent unauthorized access to the private key "1" 330.

A variation of this scheme is based on data encryption with a symmetric key; encrypting the symmetric key with the public key; provisioning of the encrypted data and the encrypted symmetric key to the client; client requesting access to the data and providing the encrypted symmetric key to the other hearing device; the other hearing device decrypting the symmetric key and providing the decrypted key to the client; and the client using the decrypted symmetric key to decrypt the encrypted health data.

This scheme avoids health data transfer for decryption to the other hearing device (which could be a significant amount of data to be transferred back and force) and the overhead of decryption of the health data on the hearing device (which could be a slow process due to the resource constraints).

Figure 3D:
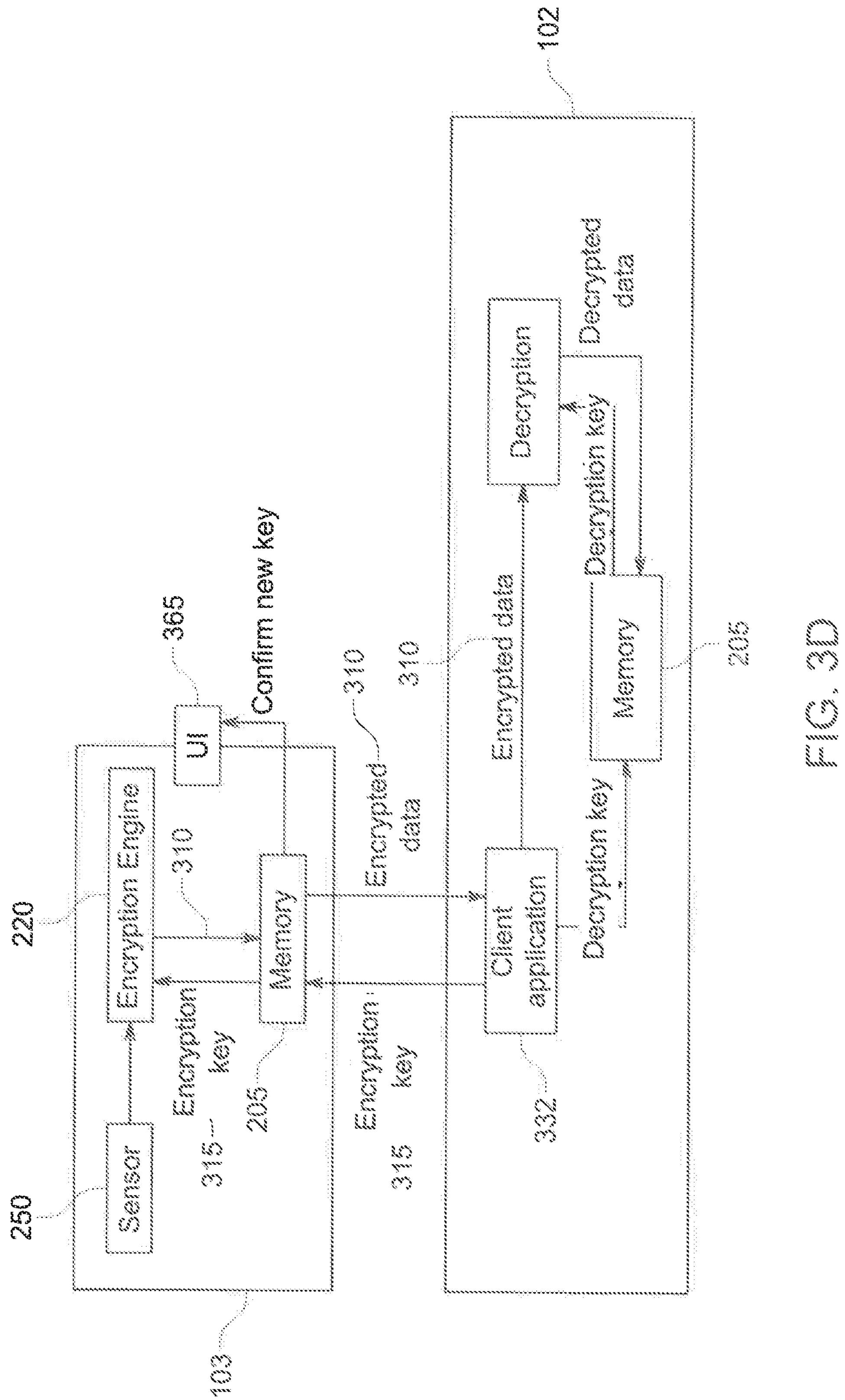
FIG. 3D illustrates an example of a system for securing data with a hearing device in accordance with principles described herein.

FIG. 3D illustrates an example of an embodiment that includes establishing a trusted relationship between a hearing device and another client (hereinafter "consumer client") to secure data. FIG. 3D illustrates a hearing device 103 and wireless communication device 102. As explained above in FIG. 2, the hearing device 103 can encrypt and/or decrypt data received from the sensor 250 using its encryption engine 220. The hearing device 103 can use an encryption key 315 to perform the encryption, where the encrypted data 310 is stored in memory 205. The encrypted data 310 can be shared with the wireless communication device 102. The hearing device includes a user interface (UI) 365. The user interface 365 can be a button, dial, or touch sensitive area on the hearing device. Alternatively, the user interface 365 can an input received from a user's mobile phone that is wirelessly connected to the user's hearing device. The user interface 365 is used to receive authorization from the hearing device user that user is giving permission to sharing data of the wireless communication device 102 (or denying permission). If authorization is given, the hearing device 103 can share the decryption key required for decrypting the information securely stored on the hearing device. If authorization is not given via the user interface 365, the hearing device cannot share the securely stored information on the hearing device 103.

Such encryption-decryption key pair can be generated in two different ways. In a first way, the hearing device 103 is configured to generate a new encryption-decryption key pair every time a wireless communication device 102 requests the decryption key. In a second way, the key pair is generated by the wireless communication device and the encryption key is shared with the hearing device 103 (after permission is received via the user interface 365). As the encryption key gets replaced, the next data set will be encrypted with that new key such that the new client can decrypt only freshly generated data.

The encryption-decryption key pair may be symmetric, i.e., the keys may be the same, or the keys may form an asymmetric key pair, such as a public-private key pair. In the following, the example of FIG. 3D will be described for an asymmetric key pair, wherein the encryption key is the public key and the decryption key is the private key of the asymmetric pair.

FIG. 3D can implement a following scheme: a first wireless communication device (a "first consumer client") generates a pair of private-public keys. The wireless communication device 102 shares the public key (i.e., the encryption key) with the hearing device. The private key (i.e., the decryption key) is guarded by the first consumer client. It never leaves the first consumer client. The hearing device generates the data, encrypts it based on the public key, and makes it readable in encrypted form (to any) consumer client. The first client reads the data from the hearing device and decrypts it based on the private key. Other consumer clients can read but not make sense of the data because they cannot decrypt it. If a second consumer client wants to collect the data from the hearing device, it has to generate another, its own, second private-public key pair.

The second consumer client provides the public key to the hearing device. In response to receiving the "new" public key, the hearing device may ignore the first public key (for example, the first public key may be overwritten with the second public key if memory space is short). Accordingly, the first client is no longer able to decrypt the data published by hearing device 103. Only the second consumer client can decrypt it. Additionally, to ensure the second consumer client is not a malicious actor attempting to "take over" the data collection of the hearing device 103, the operation of installing the public key to the hearing device may require an authorization by the user of the hearing device via the user interface 365 or by another trusted entity via the hearing device API.

Figure 4:
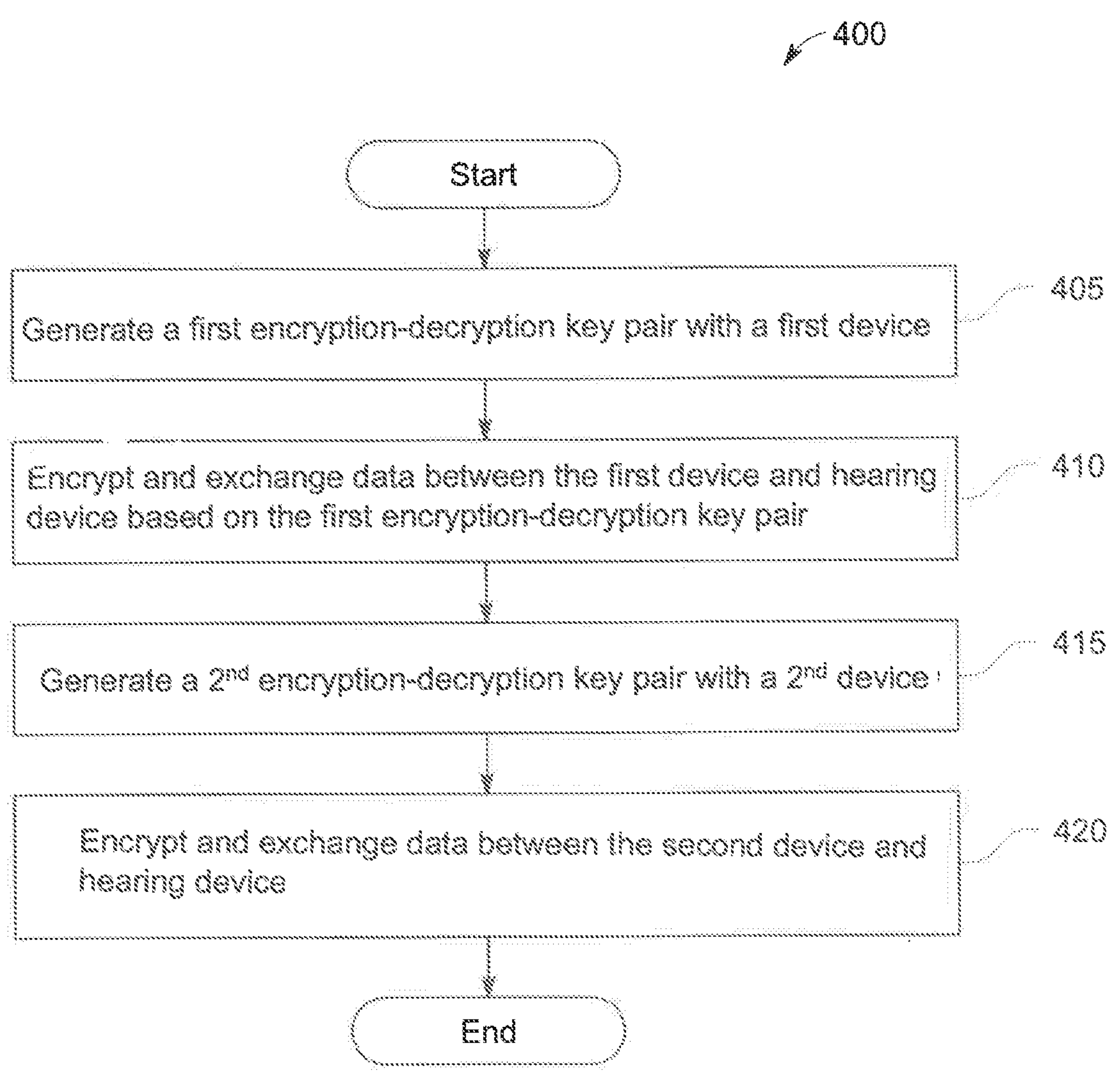
FIG. 4 is a block flow diagram illustrating an example of a process to secure data generated or received by a hearing device in accordance with principles described herein.

An example of a process 400 for using the system of FIG. 3D is illustrated in FIG. 4.

FIG. 4 illustrates a block flow diagram for an example of a process 400 for securely storing data with a hearing device. A wireless communication device 102 or the hearing device 103 may perform part or all of the process 400. The hearing device 103 can also implement process 400 based on communication with a wireless communication device 102 or vice versa.

At step generate operation 405, a wireless communication device generates a first encryption-decryption key pair. The wireless communication device can use, for example, public-key algorithms (e.g., RSA), or generate a symmetric key pair.

At exchange operation 410, the wireless communication device (e.g., via its consumer client) provides an encryption key to the hearing device. The wireless communication device can also be referred to as a "the first device" as it was the first device to provide an encryption key to the hearing device. The hearing device can encrypt data collected by its sensor using the encryption key and encryption engine on the hearing device.

At operation 415, a different wireless communication device (also referred to as a "second device") can provide a different encryption key to the hearing device. The second encryption key from the second device is paired with a second decryption key stored on the second device. By using the second decryption key, the second device can only decrypt information encrypted based the second encryption key. When the hearing device receives the second encryption key, it ignores the first encryption key and only uses the second encryption key for encryption operations. This causes the first device to not be able to decrypt information encrypted based on the second encryption key because the first device has a non-matching decryption key.

At exchange operation two 420, the wireless communication device (e.g., via its client) provides an encryption key to the hearing device. The hearing device can encrypt data collected by its sensor using the second encryption key. While the first device cannot decrypt the data encrypted based on the second encryption key on the storage device, the second device cannot decrypt the data encrypted based on the first encryption key on the storage device. Accordingly, this implementation enables the first and second devices to separately and individually establish a secure relationship for encrypting and decrypting data from the hearing device. This provides flexibility and choice for the hearing device user when exchanging encrypted information with different wireless devices.

Figure 5:
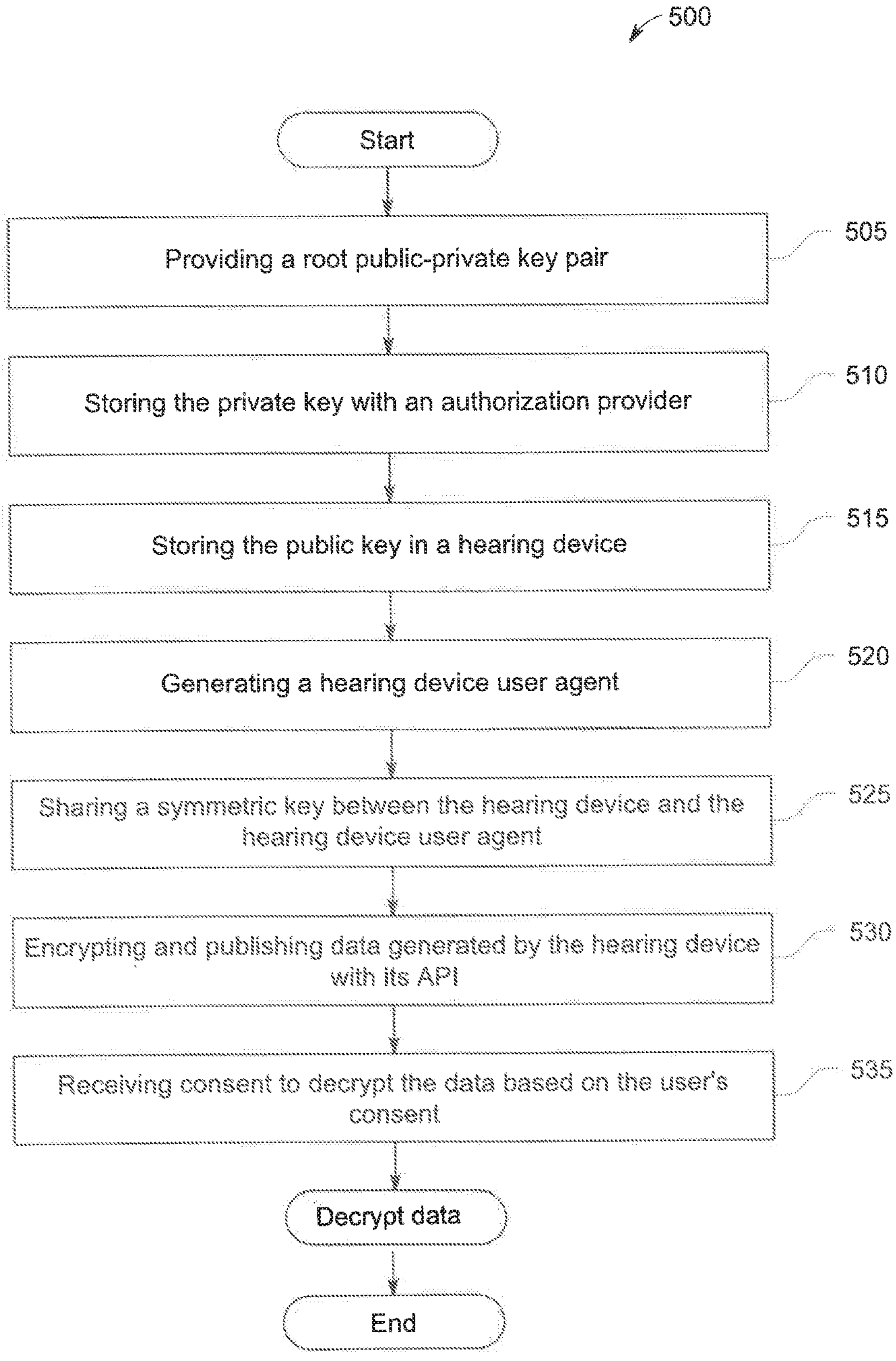
FIG. 5 is another block flow diagram illustrating an example of a process to secure hearing device data based on a root public-private key pair in accordance with principles described herein.

FIG. 5 relates to other examples of embodiments described herein and is a block flow diagram illustrating a process 500 to secure hearing device data based on a root public-private key pair. A wireless communication device 102, a hearing device 103, and hearing device manufacturer may together or separately perform operations of the process 500. The hearing device 103 can also implement process 500 based on communication with a wireless communication device 102 or vice versa.

At provide operation 505, a hearing device manufacturer or another trusted, authorized entity (e.g., an authorization service working with the hearing device manufacturer) provides the root public-private key pair.

At store private key operation 510, the hearing device manufacturer provides the private key (of the root public-private key pair) to an authorization provider. The authorization provider can be a service or a process that is configured to authorize access to the hearing device data. The authorization provider is typically available on the network (see FIG. 1, network 105).

At store public key operation 515, the hearing device manufacturer provides the public key to the hearing device and the hearing device stores the public key in its memory. The hearing device can use this public key to encrypt data stored on the hearing device.

At generate user agent operation 520, a user generates an instance of a user agent client. The user agent client can be generated by the user as a user account, e.g., by creating an instance of the user and/or the hearing device in a backend, in the cloud, or on a website. The user agent client can be considered an agent which can act for the user. Also, other parties, e.g., third parties, can create user agent clients too. The user agent client can request to access information on the hearing device based on requests from the hearing device user.

When the hearing device is in use in the field, the user agent client can implement field operation 525. The field operation 525 the user agent client establishes with the hearing device a symmetric key. The symmetric key never leaves the user agent client or the hearing device (i.e. both store it securely).

The hearing device and the user agent client can establish the symmetric key in several ways. They can establish a common symmetric key using the Diffie-Hellman key exchange protocol, where an ephemeral public key of the user agent client is authenticated by the private key of the authorization service. To authenticate the ephemeral public key of the user agent, it requests authorization from the authorization service on behalf of the user. This can happen upon the user giving consent that the user agent client is permitted to access the data on the hearing device on behalf of the user, e.g., automatically or periodically.

At operation share and exchange, the hearing device encrypts the data (e.g., health data collected from a sensor) and makes readable the encrypted data on its API. The API allows consumer clients to obtain the encrypted data via the API. However, the consumer clients are not able to decrypt the encrypted data without the correct decryption key (which can be obtained only under consent of the user).

At operation consent 535, a consumer client requests the encrypted data. The request can be sent from a health care provider, a mobile application, an analytics agent, or any other third party. The user, e.g., the hearing device user and owner of the data stored on the hearing device and available via the API, can grant consent to share the encrypted data. Once the user grants consent, the private key can be used by the authorization service to decrypt the data (via the user agent client) and share it with the party (consumer client) who requested the decrypted data.

Figure 6:
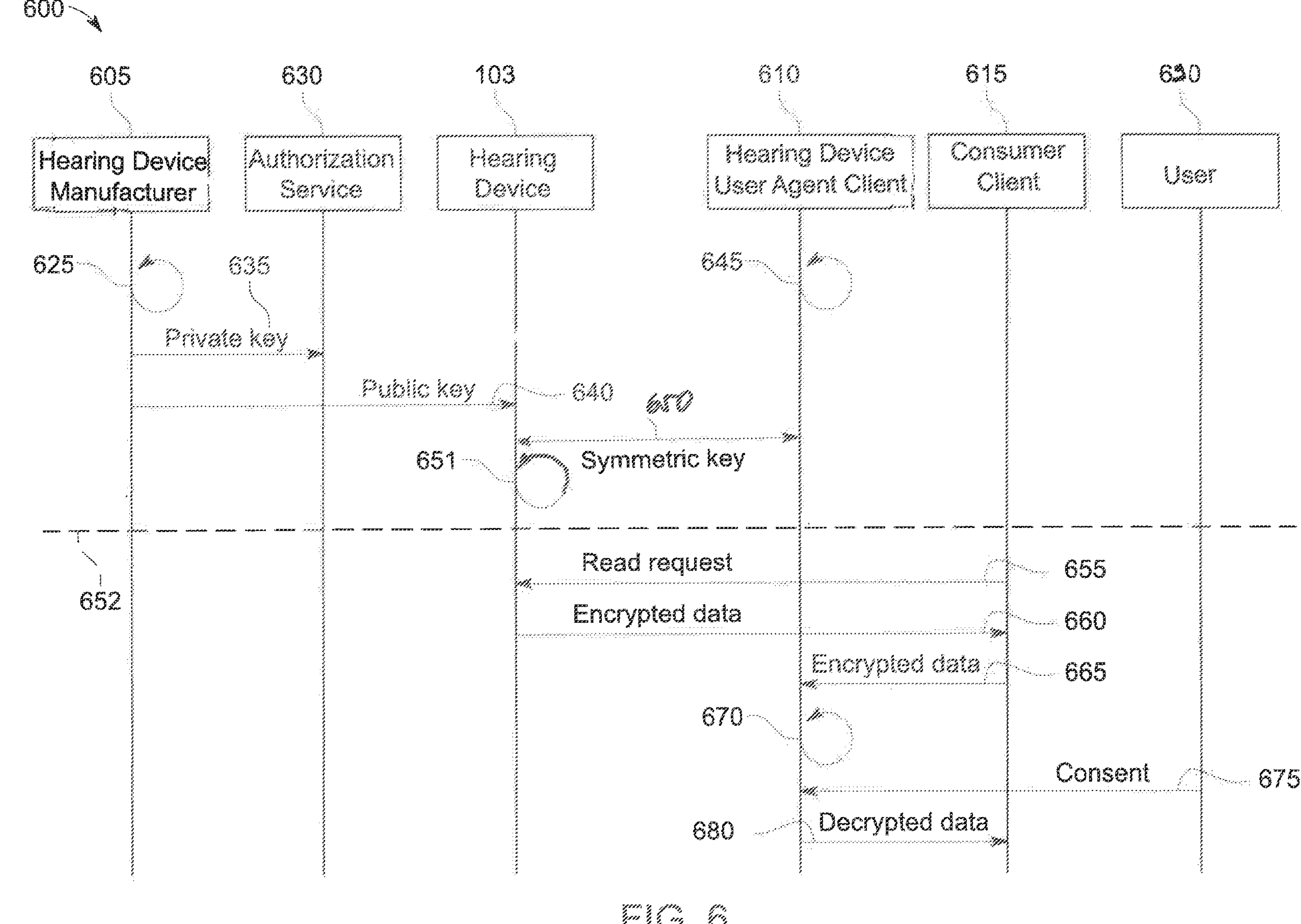
FIG. 6 is a schematic illustration of an example of implementing the process from FIG. 5.

FIG. 6 is a schematic illustration of an example of a process 600 for implementing the method of FIG. 5. FIG. 6 includes the hearing device manufacturer 605, the authorization service 630, the hearing device 103, the hearing device user agent client 610 and the consumer client 615. The hearing device manufacturer 605 can make the hearing device 103 and provide support for the hearing device over the Internet. The authorization service 630 can be a provider that enables a hearing device, hearing device user, or others to access the services of the hearing device and/or hearing device manufacturer.

As shown in FIG. 6, the hearing device manufacturer at 625 can generate a root public-private key pair. The hearing device manufacturer 605 can share the private key with the authorization service 630 as shown by arrow 635, and the hearing manufacturer 605 can share the public key with the hearing device as shown by the arrow 640 (e.g., in production). The hearing device 103 can use the public key and receive requests from other devices as shown by the circular arrow 651.

As by the double-headed arrow 650, the hearing device 103 and hearing device user agent 610 can generate and share a symmetric key. They can establish a common symmetric key using the Diffie-Hellman key exchange protocol, where an ephemeral public key of the user agent client is authenticated by the private key of the authorization service. To authenticate the ephemeral public key of the user agent client, it requests authorization from the authorization service on behalf of the user. This can happen upon the user giving consent that the user agent is permitted to access the data on the hearing device on behalf of the user, e.g., automatically or periodically. The hearing device user agent 610 can process requests from the backend related to accessing the symmetric key 645. As shown by the dashed line 652, the hearing device 103 is now set up to share and publish its data via its API, and the hearing device user agent client 610 can receive such requests to access the data on behalf of the hearing device 103.

As shown by arrow 655, a consumer client can request to read the hearing device's data via its API. The hearing device can transmit the encrypted data to the consumer client that requests the encrypted as shown by arrow 660. The encrypted data can then be shared with the hearing device user agent client 610 for decryption. The hearing device user agent client can review the request and determine that consent is necessary to decrypt the data (arrow 670). Consent 675 can be received from the consumer, e.g., the hearing device user, and then then decrypted data can be shared with the consumer client 680.

Aspects and embodiments have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware such with a wireless communication device or a hearing device.

Figure 7:
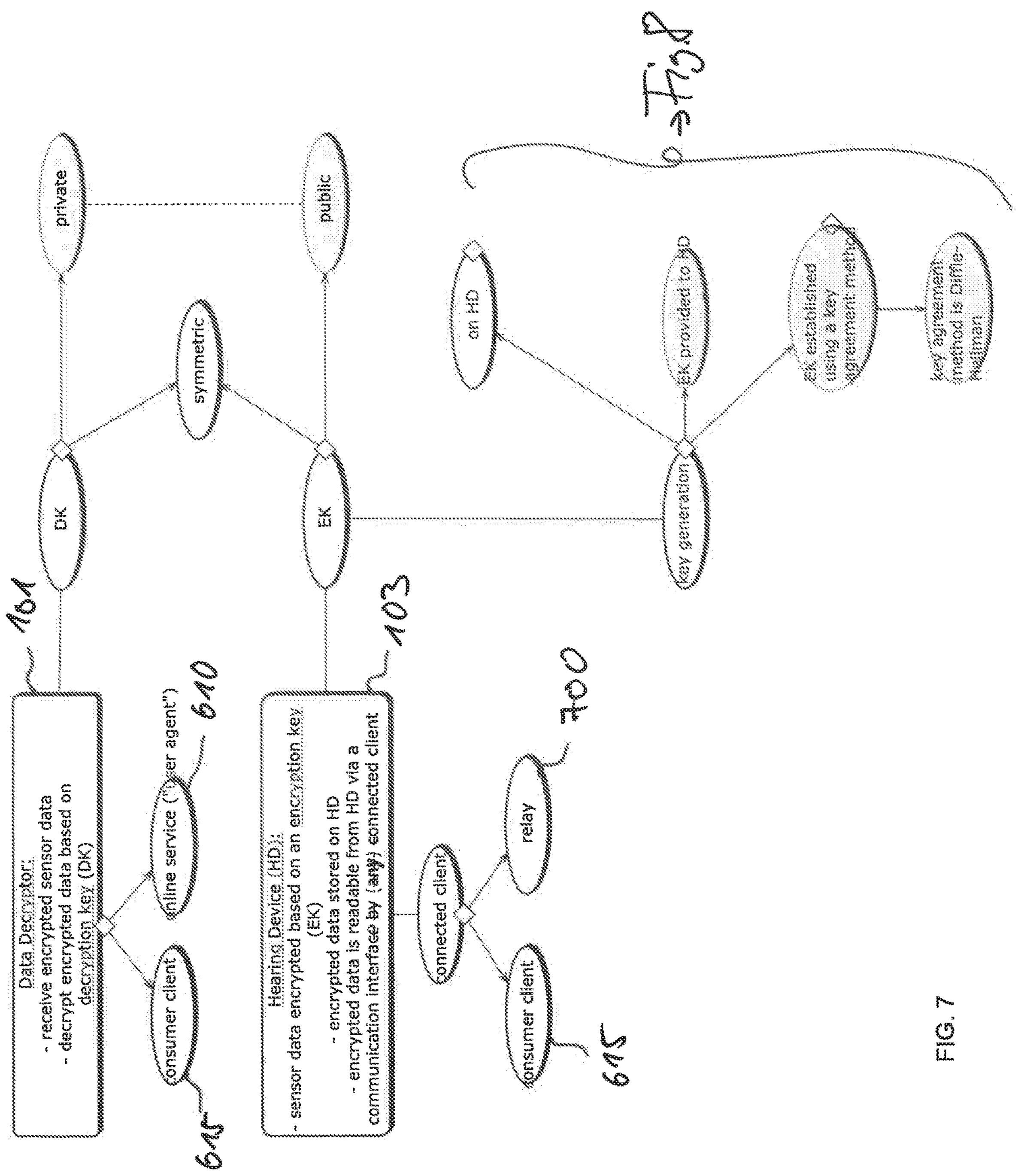
FIGS. 7 to 9 illustrate examples of the how methods described herein may be implemented.
Figure 8:
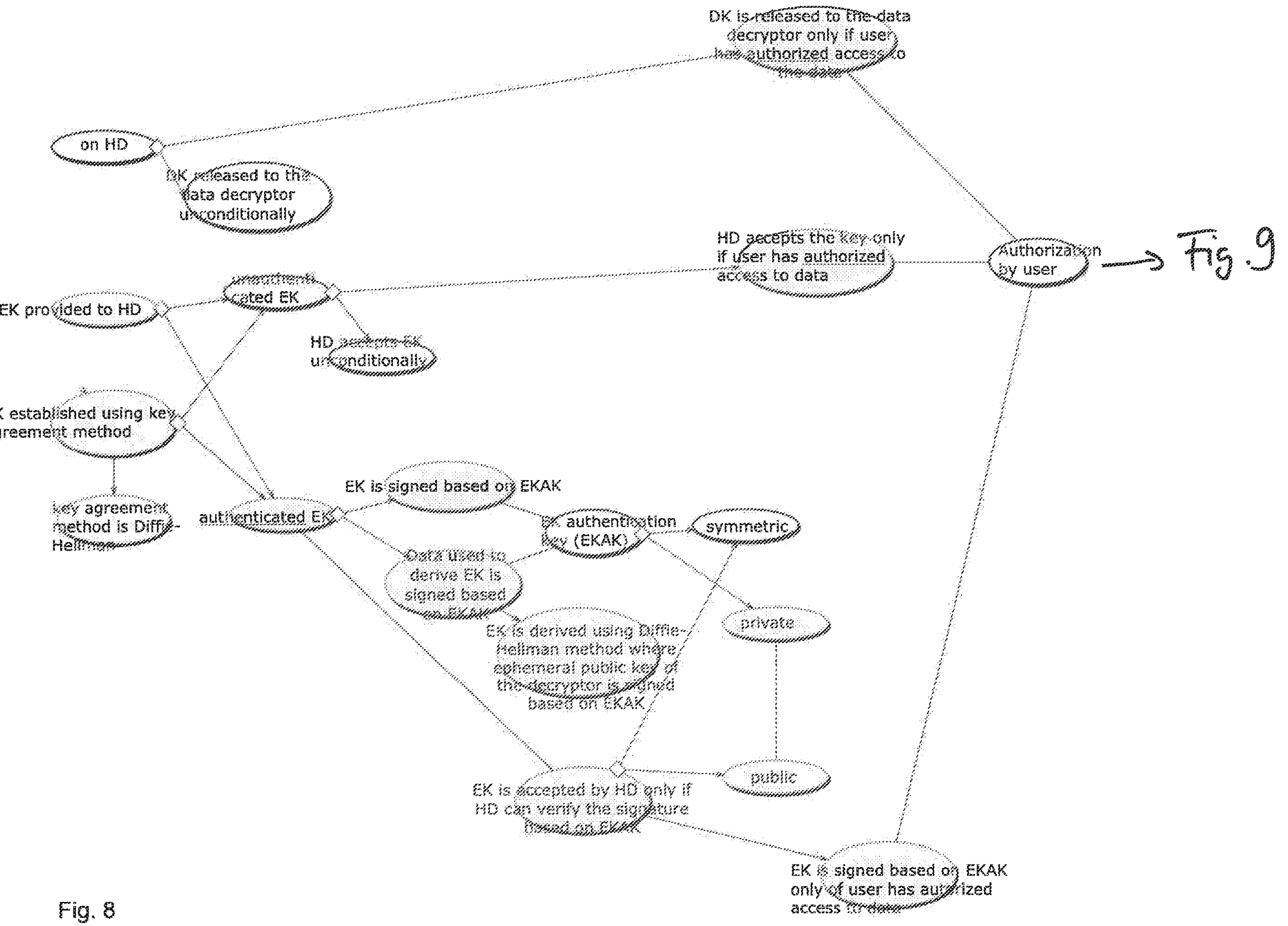
Figure 9:
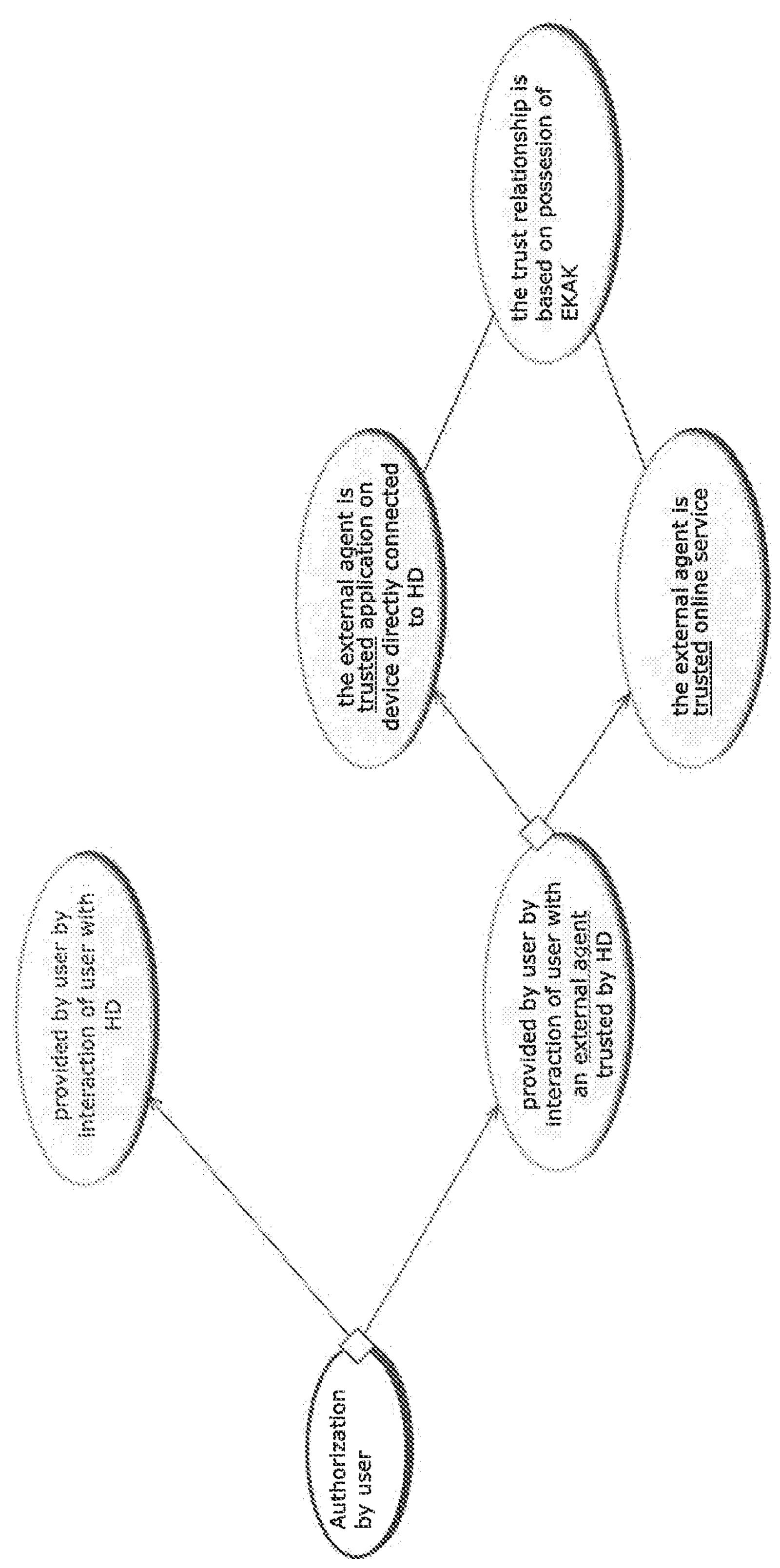

A schematic overview of examples for implementing methods for sharing data generated by a hearing device is provided by FIGS. 7 to 9.

As illustrated in FIG. 7, a hearing device 103 is provided with an encryption key EK for encrypting data generated by a sensor 250 of the hearing device, with the encrypted data being stored on the hearing device. The encrypted data is readable from the hearing device by any connected client, such as a directly connected consumer client 615 or a relay 700, via a communication interface of the hearing device 103.

An external entity 101 labelled "data decryptor" in FIG. 7, which is separate from the hearing device, is provided with a decryption key DK for decrypting data having been encrypted with the encryption key EK. Such decrypted data can be read by the external entity 101 directly from the communication interface of the hearing device 103, or the decrypted data may be provided to the external entity by another entity, e.g., a relay device 700. For example, the external entity 101 may be a consumer client 615 connected to the hearing device 103 or an online service (acting as user agent 610).

The encryption key EK and the decryption key DK may form symmetric key pair (i.e., they may be the same), or they may form a asymmetric pair, such as public-private key pair.

As illustrated in FIG. 8, there are several options of how the keys EK, DK may be generated.

According to a first variant, both the encryption key EK and the decryption key DK are autonomously generated on the hearing device 103, so that the hearing device, in principle, can control distribution of the decryption key DK.

According to one example, the decryption key DK is provided to the external entity 101 only if a user of the hearing device has authorized access of the external entity 101 to the data generated by the hearing device sensor 250. According to an alternative example, the decryption key DK may be provided unconditionally to the external entity 101, in which case the hearing device 103 would not make the encrypted data available on the communication interface until a data access authorization has been given by the user.

According to a second variant, the encryption key EK is externally provided to the hearing device 103; so that the hearing device 103 has no direct control of the distribution of the decryption key DK (rather, the external instance providing the encryption key EK also has control of matching decryption key DK). In this case, the hearing device 103 may protect the sensor data, for example, by only selectively accepting the encryption key EK.

According to one example, the hearing device 103 accepts the encryption key EK only if a user of the hearing device 103 has authorized access of the external entity 101 to the data generated by the hearing device sensor. Alternatively, the hearing device 103 could accept the encryption key EK unconditionally, in which case the hearing device 103 would reject data processing (reading data from the sensor 250, encrypting data, make data available on communication interface) until a data access authorization has been given by the user.

According to an alternative example, the encryption key EK is authenticated by using an authentication key ("EKAK"), which, for example, may be used for signing the encryption key EK based on the authentication key EKAK. In particular, the encryption key EK may be signed based on the authentication key EKAK only if the user has authorized access of the external entity 101 to the data generated by the hearing device sensor 250.

In one example, the authentication key EKAK is provided as the private part of a root key pair (this enhances safety compared to a symmetric authentication key EKAK); in particular, the encryption key EK may be accepted by the hearing device 103 only if the hearing device can verify the signature based on the authentication key EKAK using the public part of the root key pair.

According to a third variant, the encryption key EK is established in the hearing device 103 using a key agreement method. This implies that also the decryption key DK can be controlled by the key agreement method.

According to one example, the encryption key EK is not authenticated and the hearing device 103 accepts the encryption key EK only if a user of the hearing device 103 has authorized access of the external entity to the data generated by the hearing device sensor 250, as in the example mentioned above with regard to the second variant.

According to an alternative example, the encryption key EK is authenticated by using an authentication key EKAK, as in the example mentioned above with regard to the second variant. In particular, the data used to establish the encryption key EK may be signed based on the authentication key EKAK. For example, the data used to establish the encryption key EK may be signed based on the authentication key only if the user has authorized access of the external entity 101 to the data generated by the hearing device sensor 250.

According to one example, the key agreement method is a Diffie-Hellman method. In particular, the ephemeral public key of the external entity 101 may be signed based on the authentication key EKAK.

As in the example mentioned above with regard to the second variant, the authentication key EKAK may be provided as the private part of a root key pair; in particular, the encryption key EK may be accepted by the hearing device 103 only if the hearing device can verify the signature based on the authentication key EKAK using the public part of the root key pair.

FIG. 9 illustrates several examples of how the access to the data generated by the hearing device sensor 250 may be authorized by the user.

According to one example, the user may authorize access of the external entity 101 to the data generated by the hearing device sensor 250 by user interaction with the hearing device 103, in particular, via an appropriate user interface.

According to an alternative example, the user may authorize access of the external entity 101 to the data generated by the hearing device sensor 250 by user interaction with an external agent 610 trusted by the hearing device. For example, the external agent 610 may be a trusted application on a device directly connected to hearing device 103 and possessing an external agent authentication key which can be verified by the hearing device 103. Alternatively, the external agent 610 may a trusted online service possessing an external agent authentication key which can be verified by the hearing device 103. In both cases, the trust relationship is based on the possession of an authentication key by the external agent.

What is claimed is:

1. A method for sharing data generated by a hearing device, comprising providing an encryption key in the hearing device;

providing a decryption key in an external entity separate from the hearing device;

generating data by a sensor of the hearing device, encrypting the data with the encryption key and storing the encrypted data on the hearing device;

reading the encrypted data from the hearing device; and decrypting the read encrypted data with the decryption key in the external entity, wherein a user authorizes access to the sensor generated data by the external entity;

wherein the encryption key is externally provided to the hearing device;

wherein the hearing device accepts the encryption key only if a user of the hearing device has authorized access of the external entity to the data generated by the hearing device sensor.

2. The method of claim 1, wherein the encryption key is established in the hearing device using a key agreement method.

3. The method of claim 2, wherein the encryption key is not authenticated, and wherein the hearing device accepts the encryption key only if the user of the hearing device has authorized access of the external entity to the data generated by the hearing device sensor.

4. The method of claim 3, wherein the data used to establish the encryption key is signed based on the authentication key, only if the user has authorized access of the external entity to the data generated by the hearing device sensor.

5. The method of claim 3, wherein the authentication key is provided as a private part of a root key pair and wherein the encryption key is accepted by the hearing device only if the hearing device can verify a signature based on the authentication key using a public part of the root key pair.

6. The method of claim 1, wherein the user authorizes access of the external entity to the data generated by the hearing device sensor by user interaction with the hearing device or wherein the user authorizes access of the external entity to the data generated by the hearing device sensor by user interaction with an external agent trusted by the hearing device.

7. The method of claim 6, wherein the external agent is a trusted application on a device directly connected to hearing device and possessing an external agent authentication key which can be verified by the hearing device or wherein the external agent is a trusted online service possessing an external agent authentication key which can be verified by the hearing device.

8. The method of claim 1, wherein the external entity is a consumer client connected to the hearing device or wherein the external entity is an online service.

9. A method for sharing data generated by a hearing device comprising:

providing an encryption key in the hearing device;

providing a decryption key in an external entity separate from the hearing device;

generating data by a sensor of the hearing device, encrypting the data with the encryption key and storing the encrypted data on the hearing device;

reading the encrypted data from the hearing device; and decrypting the read encrypted data with the decryption key in the external entity, wherein a user authorizes access to the sensor generated data by the external entity;

wherein the encryption key is signed by using an authentication key;

wherein the encryption key is signed based on the authentication key only if the user has authorized access of the external entity to the data generated by the hearing device sensor.

10. The method of claim 9, wherein the authentication key is provided as a private part of a root key pair, and wherein the encryption key is accepted by the hearing device only if the hearing device can verify a signature based on the authentication key using a public part of the root key pair.

* * * * *